(12) United States Patent
Raza et al.

(10) Patent No.: US 10,116,558 B2
(45) Date of Patent: Oct. 30, 2018

(54) PACKET SWITCH USING PHYSICAL LAYER FIBER PATHWAYS

(71) Applicant: Fiber Mountain, Inc., Cheshire, CT (US)

(72) Inventors: Mohammad H. Raza, Cheshire, CT (US); David G Stone, Irvine, CA (US); Aristito Lorenzo, Plantsville, CT (US); Ronald M. Plante, Prospect, CT (US); Phuc Minh Ly, Waterbury, CT (US); Keith Ouellette, Burlington, CT (US)

(73) Assignee: Fiber Mountain, Inc., Cheshire, CT (US)

( * ) Notice: Subject to any disclaimer, the term of this patent is extended or adjusted under 35 U.S.C. 154(b) by 22 days.

(21) Appl. No.: 14/604,344

(22) Filed: Jan. 23, 2015

(65) Prior Publication Data

US 2015/0215208 A1    Jul. 30, 2015

Related U.S. Application Data

(60) Provisional application No. 61/930,979, filed on Jan. 24, 2014, provisional application No. 61/972,121, filed on Mar. 28, 2014, provisional application No. 62/020,894, filed on Jul. 3, 2014, provisional application No. 62/057,008, filed on Sep. 29, 2014, provisional application No. 62/057,086, filed on Sep. 29, 2014.

(51) Int. Cl.
*H04L 12/28* (2006.01)
*H04L 12/715* (2013.01)
*H04L 12/721* (2013.01)

(52) U.S. Cl.
CPC .............. *H04L 45/64* (2013.01); *H04L 45/44* (2013.01)

(58) Field of Classification Search
CPC .................................. H04L 45/44; H04L 49/15
USPC .......................................................... 370/400
See application file for complete search history.

(56) References Cited

U.S. PATENT DOCUMENTS

| 5,101,151 A | 3/1992 | Beaufils et al. |
| 5,457,556 A | 10/1995 | Shiragaki |

(Continued)

FOREIGN PATENT DOCUMENTS

| EP | 1592181 | 11/2005 |
| EP | 1592181 A1 | 11/2005 |
| WO | 2013171042 A1 | 11/2013 |

OTHER PUBLICATIONS

LHCB Online System Data Acquisition & Experiment Control. 2001. [retrieved on Sep. 4, 2015]. Retrieved from the Internet:<URL: http://lhcb-comp.web.cern.ch/lhcb-comp/General/Publications/onlinetdr.pdf>.

(Continued)

*Primary Examiner* — Peter Cheng
(74) *Attorney, Agent, or Firm* — Wissing Miller LLP

(57) ABSTRACT

The present disclosure relates to a system for communicating traffic within a network. The system includes a plurality of switches for receiving/transmitting traffic within the network, a programmable physical layer pathway for providing one or more pathways between the plurality of switches and a controller for controlling the plurality of switches and the programmable physical layer pathway for optimizing a flow of traffic within the network, wherein the controller defines the pathway based on a destination of traffic received by the plurality of switches.

11 Claims, 6 Drawing Sheets

(56) References Cited

U.S. PATENT DOCUMENTS

| | | |
|---|---|---|
| 5,493,565 A | 2/1996 | Hanson et al. |
| 5,838,681 A | 11/1998 | Bonomi et al. |
| 5,892,770 A | 4/1999 | Wolf et al. |
| 6,067,585 A | 6/2000 | Hoang |
| 6,188,702 B1 | 2/2001 | Tornetta et al. |
| 6,243,510 B1 | 6/2001 | Rauch |
| 6,765,877 B1* | 7/2004 | Foschiano ............... H04L 45/02 370/242 |
| 6,980,725 B1 | 12/2005 | Swieconek |
| 7,226,217 B1 | 6/2007 | Benton et al. |
| 7,277,425 B1 | 10/2007 | Sikdar |
| 7,492,714 B1 | 2/2009 | Liao et al. |
| 7,606,494 B1 | 10/2009 | Weston-Dawkes et al. |
| 7,772,975 B2 | 8/2010 | Downie et al. |
| 7,782,202 B2 | 8/2010 | Downie et al. |
| 7,965,186 B2 | 6/2011 | Downie et al. |
| 8,138,925 B2 | 3/2012 | Downie et al. |
| 8,264,366 B2 | 9/2012 | Chamarti et al. |
| 8,421,626 B2 | 4/2013 | Downie et al. |
| 9,159,012 B2 | 10/2015 | Downie et al. |
| 2001/0015839 A1 | 8/2001 | Koh et al. |
| 2003/0026205 A1 | 2/2003 | Mullendore et al. |
| 2003/0030866 A1 | 2/2003 | Yoo |
| 2004/0029417 A1 | 2/2004 | Engel et al. |
| 2006/0018329 A1 | 1/2006 | Nielsen et al. |
| 2006/0148279 A1 | 7/2006 | German et al. |
| 2006/0186926 A1 | 8/2006 | Yager et al. |
| 2006/0251419 A1 | 11/2006 | Zadikian et al. |
| 2007/0291535 A1 | 12/2007 | Eberle et al. |
| 2008/0062980 A1* | 3/2008 | Sunaga ............... G02B 6/4246 370/389 |
| 2008/0101229 A1 | 5/2008 | Meleis et al. |
| 2009/0074414 A1 | 3/2009 | Miles et al. |
| 2009/0226181 A1 | 9/2009 | Fingler et al. |
| 2010/0098412 A1 | 4/2010 | Boyd et al. |
| 2010/0211664 A1 | 4/2010 | Raza et al. |
| 2010/0129078 A1 | 5/2010 | Weston-Dawkes et al. |
| 2010/0142544 A1 | 6/2010 | Chapel et al. |
| 2010/0211665 A1 | 8/2010 | Raza et al. |
| 2010/0211697 A1 | 8/2010 | Raza et al. |
| 2010/0215049 A1 | 8/2010 | Raza et al. |
| 2010/0266117 A1 | 10/2010 | Enge et al. |
| 2011/0092100 A1 | 4/2011 | Coffey et al. |
| 2011/0116748 A1 | 5/2011 | Smrha et al. |
| 2011/0188383 A1 | 8/2011 | Koziy et al. |
| 2011/0228473 A1 | 9/2011 | Anderson et al. |
| 2011/0255829 A1 | 10/2011 | Anderson et al. |
| 2011/0292788 A1* | 12/2011 | Tsuchiya ............. H04L 12/4625 370/218 |
| 2012/0008945 A1 | 1/2012 | Singla et al. |
| 2012/0069839 A1 | 3/2012 | Kunz et al. |
| 2012/0219005 A1 | 8/2012 | Durve et al. |
| 2012/0243554 A1 | 9/2012 | Sybesma et al. |
| 2012/0246362 A1 | 9/2012 | Anne et al. |
| 2013/0148976 A1 | 6/2013 | Patel et al. |
| 2013/0177309 A1 | 7/2013 | Ei-Ahmadi et al. |
| 2013/0179622 A1 | 7/2013 | Pratt et al. |
| 2013/0194005 A1 | 8/2013 | Voutilainen et al. |
| 2013/0343755 A1 | 12/2013 | Cvijetic |
| 2014/0019662 A1 | 1/2014 | Coffey |
| 2014/0036920 A1 | 2/2014 | McCormick et al. |
| 2014/0270634 A1* | 9/2014 | Miller ................ H04Q 11/0005 385/16 |
| 2014/0270762 A1 | 9/2014 | Li et al. |
| 2014/0317249 A1 | 10/2014 | Janakiraman et al. |
| 2015/0124608 A1* | 5/2015 | Agarwal ............... H04L 47/122 370/235 |

OTHER PUBLICATIONS

International Search Report and Written Opinion, mailed in PCT/US15/23077 on by ISA/US dated Jul. 7, 2015.

International Search Report and Written Opinion, mailed in PCT/US15/39045 on by ISA/US dated Oct. 2, 2015.

International Search Report and Written Opinion, mailed in PCT/US2015/052847 by ISA/US dated Jun. 30, 2016.

International Search Report and Written Opinion, mailed in PCT/US2015/052924 by ISA/US dated Feb. 2, 2016.

International Search Report and Written Opinion, mailed in PCT/US2016/026714 by ISA/US dated Jul. 12, 2016.

International Search Report and Written Opinion, mailed in PCT/US15/12795 on by ISA/US dated May 18, 2015.

Extended European Search Report mailed in corresponding EP Application 15741011 dated Sep. 11, 2017.

Lei et al. "OpenFlow-based Wavelength Path Control in Transparent Optical Networks: a Proof-of-Concept Demonstration" 37th European Conference and Exposition on Optical Communications, (Jan. 1, 2011).

Liu et al. "Experimental validation and performance evaluation of OpenFlow-based wavelength path control in transparent optical networks" Optics Express, OSA Publishing, vol. 19, No. 27 (Dec. 19, 2011), pp. 26578-26593.

* cited by examiner

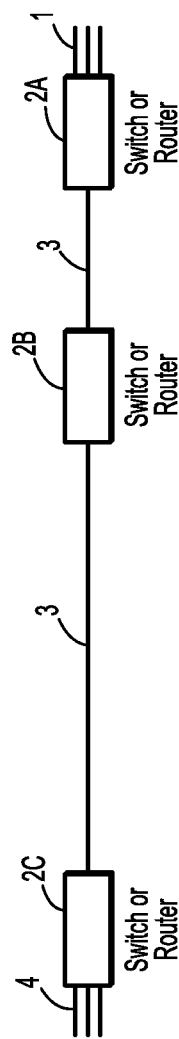
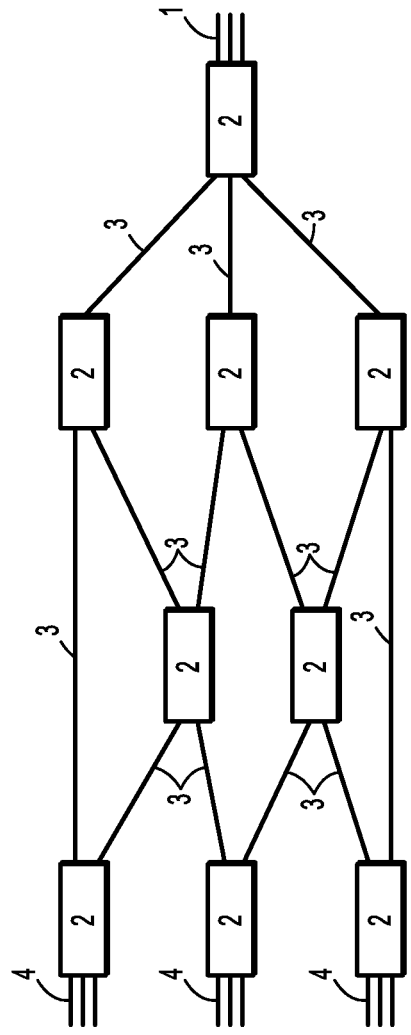
Prior Art
FIG. 1
Prior Art
FIG. 2

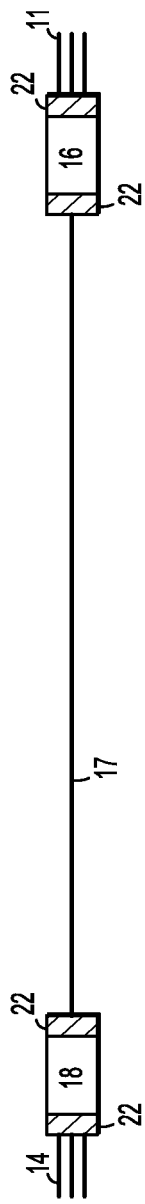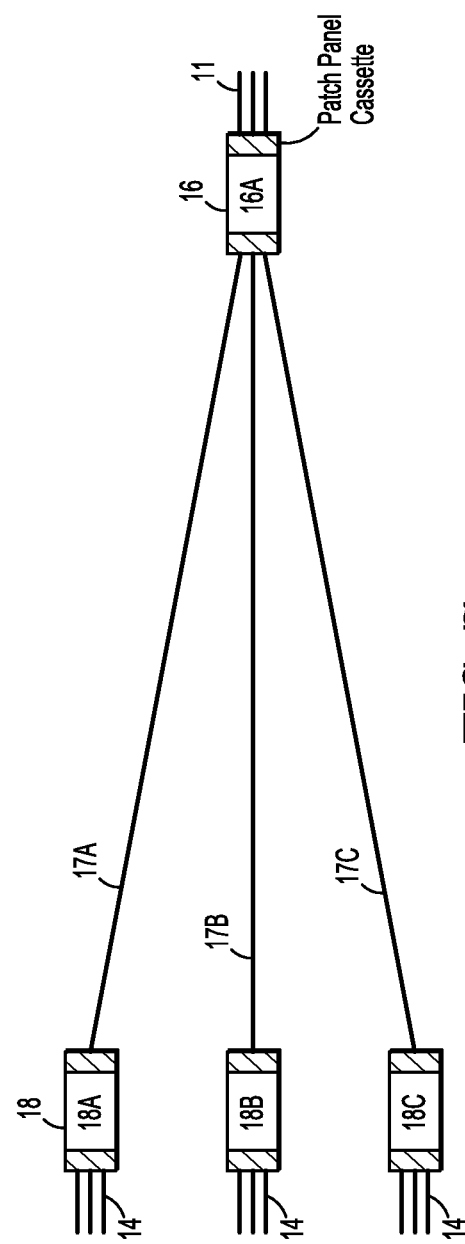

PACKET SWITCH USING PHYSICAL LAYER FIBER PATHWAYS

CROSS-REFERENCE TO RELATED APPLICATIONS

This application claims priority to U.S. Provisional Application No. 61/930,979, filed on Jan. 24, 2014, entitled "Packet Switch Using Physical Layer Fiber Pathways and Software Control to Groom Traffic in a Network"; U.S. Provisional Application No. 61/972,121, filed on Mar. 28, 2014, entitled "Built In Redundancy of Alternate Links Within a Switch"; U.S. Provisional Application No. 62/020,894, filed on Jul. 3, 2014, entitled "Data Center Path Switch With Improved Path Interconnection Architecture"; U.S. Provisional Application No. 62/057,008, filed on Sep. 29, 2014, entitled "System For Increasing Fiber Port Density in Data Center Applications"; and U.S. Provisional Application No. 62/057,086, filed on Sep. 29, 2014, entitled "Data Center Network", each of which is incorporated herein in their entirety by reference.

BACKGROUND

Field

The present disclosure relates generally to communications systems, and more particularly to patching and switching systems used in communications systems.

Description of the Related Art

Communication networks (or networks) include many network devices, such as switches, routers, storage devices, computers, telephone systems, servers, and other hardware and software that form infrastructures used for communications, which includes data, voice and video communications. Networks can be implemented in many types of environments including, for example, homes, business offices, data centers, and carriers, etc.

In most networks, many active network devices are connected to each other through network switches and routers. Network switches and routers have the ability to learn how to reach each other through learning methods and protocols which are well known in the industry. Alternatively, the network switches and routers are able to be configured by network administrators in a way that allows the network switches and routers to transport packets from one location to another. The switches and routers are constantly learning about other network devices added to or removed from the network and storing this topology information in a table within the switch or router. When a packet is received by a switch or router at a port or interface, the switch or router inspects the packet for certain information, such as the destination address, or other information and then performs a table lookup to determine where to send the packet. The packet is then transmitted out of a port of a switch or router towards the intended destination. The above process of receiving and transmitting of a packet at a switch or router is known as packet processing, or is sometimes referred to as a "hop" in the network.

To assist network administrators in managing packet processing, there are Network Management Systems (NMS) available that can draw a logical connection map between switches and routers and associated network devices within the network. However, network management systems typically do not control the flow of traffic (or packets transmitted or received), or the mapping of actual traffic that passes through a network. Hence, most network administrators do not know the actual path that a packet or set of packets takes through the network.

Networks are growing and changing at a rapid pace. This growth in networks is caused by many factors, some of which are growth in bandwidth usage with video or high bandwidth applications on the network, such as social networking, the increase in number of servers to support the social networking or business applications, server virtualization, and the introduction of cloud based computing. Networks at carriers, data centers, and enterprises are faced with a staggering increase in the number of switches needed to support the growth.

In a traditional network, switches and routers connect to each other and to servers, computers, storage devices, telephone systems, and other such devices. FIG. 1 shows a simple network, where each switch or router 2 has several ports 1, and where the ports 1 are connected to other network devices, which can include other switches, routers, servers, computers, telephones, and other devices. Packets are received at the ports 1 and then transmitted on fiber optic or copper cables 3 in the network. In FIG. 1, switch or router 2A receives the packets from ports 1 and then transmits the packets on copper or fiber optic cables 3 towards switch or router 2B. Switch or router 2B receives the packets, performs packet processing which includes a table lookup and then transmits the packets on fiber optic or copper cables 3 on towards switch or router 2C. Switch or router 2C receives the packet, does a table look-up and transmits the packet on to its destination port 4. FIG. 2 depicts a more complex network than that in FIG. 1 and shows a plurality of switches and/or routers 2 in the network. Each switch or router 2 is involved in packet processing.

FIG. 1 and FIG. 2 show how hop-by-hop packet processing occurs in a network. As the size of the network grows and more switches and routers are added, packets have to pass through more hops, and hence additional packet processing stops are made, and the complexity of the network grows. FIG. 3 depicts an even more complex network that includes a plurality of physical layer patch panels in the network. The ports of each switch or router 2 are connected directly to a port of a patch panel 5. A corresponding port on the patch panel 5 is then connected to a port of another switch or router 2 via a port on a patch panel 5.

The use of patch panels further complicates the network. As the number of switches and routers 2 in the network increases, the number of patch panel ports also increases, necessitating more patch panels be provided. This adds to the space requirements for the network as well as the overall complexity of the network architecture.

With the increase in number of switches, routers, etc., the complexity of the network has grown significantly. More switches in the network, translates to more hops. In these more complex networks, packets endure additional processing, which increases the latency or delay for the packet to travel from one point to another in the network, and also increases the cost of maintaining and operating the network. This additional complexity also results in space, power and heat issues within the network, because the additional switches, routers and patch panels need physical space, consume power, and generate heat.

In the industry, the network devices referenced above are typically connected using physical layer connectivity products, such as fiber optic cables or copper cables, and patch panels. For every connection in the logical layer (of the OSI model), there are several connection points in the physical layer (of the OSI model), which means that for every switch port there are several (additional) corresponding physical layer ports implemented at patch panels and cross connects.

As the number of switches, routers, server hardware, etc. in the network grows, the number of patch panels will also grow. This adds to the cost of the network and puts more strain on space requirements as well as day-to-day maintenance and operating requirements.

It would be highly desirable to design a network with less devices and at the same time address the growth requirements in carrier, data center and enterprise networks.

BRIEF SUMMARY

The present disclosure relates to a system and method for communicating traffic within a network. The system includes a plurality of switches for receiving/transmitting traffic within the network, a programmable physical layer pathway for providing one or more pathways between the plurality of switches and a controller for controlling the plurality of switches and the programmable physical layer pathway for optimizing a flow or a plurality of flows of traffic within the network, wherein the controller defines the pathway across the network based on destinations of traffic or packets received by the plurality of switches.

BRIEF DESCRIPTION OF THE DRAWINGS

FIG. 1 depicts a simple network according to the prior art;

FIG. 2 depicts a more complicated network according to the prior art;

FIG. 6 depicts a network system including patch panel modules according to an embodiment of the present disclosure; and FIG. 7 depicts a network system according to an embodiment of the present disclosure.

DETAILED DESCRIPTION

According to an embodiment of the present disclosure, a system is provided that utilizes software to communicate with switches, routers, patch panels, and copper and fiber optic cables to guide the movement of packets in the network. The system reduces bandwidth load from core switches, spine switches, central switches, and aggregation switches and uses fiber optic pathways to transport packets across the central portions of the network. The system is able to support the tremendous growth in network bandwidth requirements with fewer switches in the network, thus translating to a lower cost of equipment acquisition, lower consumption of power, lower amounts of heat dissipation, and lower requirements for cooling.

Embodiments of the present disclosure may include a control and orchestration system capable of discovering all physical connection paths within a network, controlling one or more switches within the network and capable of reconfiguring the physical connections. Traffic can be groomed at one or more of the switches within the network for optimal traffic flow. The switches may include one or more transponders and/or transceivers for performing optical-to-electrical signal conversion and/or electrical-to-optical signal conversion. Each switch may also include one or more optical cross connects or the like. Each switch may also include a module for communicating with the control and orchestration system. The control and orchestration system controls the transponders and/or transceivers as well as the optical cross connects allowing system administrators to reconfigure the network from a central location without the need for human intervention at the network interfaces.

Figure 4:
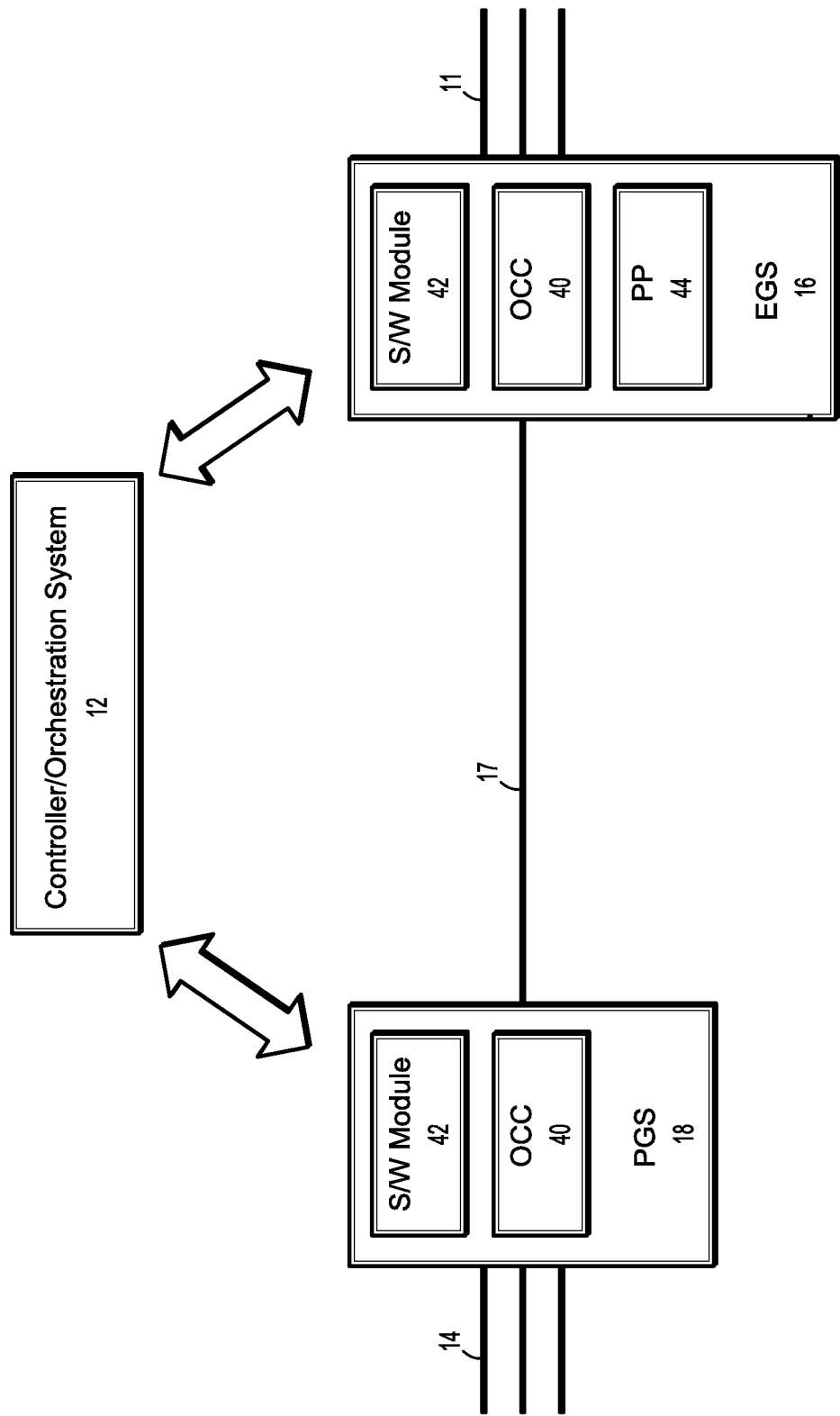
FIG. 4 depicts a network system according to an embodiment of the present disclosure.

An embodiment of the present disclosure is shown in FIG. 4 and includes a plurality of switches such as at least one Edge Grooming Switch (EGS) 16 and at least one Path Grooming Switch (PGS) 18. EGS 16 and PGS 18 are interconnected using one or more bundled fiber cables with high density fiber connections, such as Multi-fiber Push On (MPO) connectors, MXC connectors, or other high density fiber connectors 17. MPO or MXC connection 17 may be, for example, a cable (e.g., a ribbon cable) having a plurality of fiber optic cables terminating in MPO connectors or the like. EGS 16 and PGS 18 include one or more optical cross connects 40 as well as software modules 42 allowing communication between the switches and the Controller/Orchestration System 12. EGS 16, PGS 18—are software configurable by Controller/Orchestration System 12. This allows the network administrator to dynamically reconfigure the system as desired. MPO/MXC connection 17 has a plurality of optical fibers or Physical Layer Pathways as will be described later below. EGS 16 receives traffic (e.g., packets) from copper or fiber optic ports 11, converts the traffic to optical traffic signals (in the case of electrical signal traffic arriving over copper ports), performs processing via Packet Processor 44 on the packet within the PLP and further groom it to be transmitted and transmits this traffic onto one or more of the Physical Layer Pathways (PLPs) consisting of individual fibers or fiber groups within the MPO/MXC connection 17. PGS 18 receives the entire traffic transmitted by EGS 16 via these PLPs in the MPO/MXC connection 17. Depending on the programmed configuration, PGS 18 can make an appropriate connection for the entire traffic from a PLP to transmit this traffic via one or more interfaces 14 to a final destination or a next node within the network.

Ports 11 of EGS 16 may include one or more copper based ports which may utilize RJ-45 type copper connectors or similar connectors. Ports 11 may also include one or more fiber optic ports which are connected to using one or more of several types of fiber optic connectors including LC, SC, MPO, MTP, MXC, SFP+, QSFP, QSFP+, etc. The ports 11 may be implemented directly on EGS 16 or may be implemented on a cassette or card that can be plugged into the EGS 16. The EGS 16 receives traffic from devices that are connected on these copper or fiber optic ports and grooms the traffic to be transported across the network over PLPs which can be implemented using MTP/MPO, MXC fiber trunks, or other types of trunks. The grooming process is controlled by Controller/Orchestration system 12 which is able to identify, define and assign each PLP, for example each PLP within each connector 17, based on the traffic's destination and is configurable by network administrators.

The packets that are sent into the network from an EGS 16 are received by one or more PGSs 18. PGS 18 may have one or more types of output ports 14. For example, these ports may include RJ-45 type connectors or similar copper connectors. Ports 14 may also include one or more fiber optic ports which are connected to using one or more of several types of fiber optic connectors including but not limited to LC, SC, MPO, MTP, SFP+, QSFP, etc. The ports 14 may be implemented directly on PGS 18 or may be implemented on a cassette or card (e.g., a small form factor cage and associated transceiver) that can be plugged into the PGS 18. PGS 18 can perform multiple functions depending on where it is located in the network. PGS 18 receives traffic from one or more EGS 16 devices or from another PGS 18 on one or more PLPs, and then switches this traffic for further transmission. PGS 18 is capable of receiving traffic on a PLP, and switching the individual PLPs or fiber pathways. That is, PGS 18 can switch the traffic traveling along a PLP from one MPO connection on to another PLP of another MPO connection for transporting the traffic to another node or its intended destination. PGS 18 is also capable of receiving traffic from a number of PLPs, and switching the traffic for delivery to a destination switch, router or other device port using a single interface, or a number of interfaces with connectors such as, for example, LC, SC, MPO, MTP, MXC, SFP+, QSFP, QSFP+, etc. PGS 18 can redirect it, or switch it to a destination fiber port which can be implemented using, for example, LC, SC, MPO, MTP, MXC, SFP+, QSFP, QSFP+, etc.

Figure 5A:
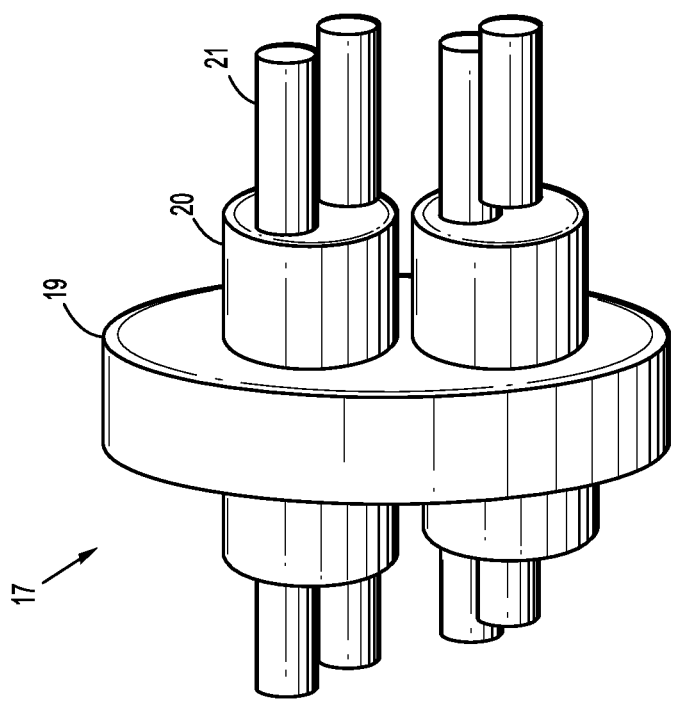
FIGS. 5A and 5B depict an MPO connection according to an embodiment of the present disclosure.

FIG. 5A shows in more detail Multi-fiber connection 17 according to an embodiment of the present disclosure. Multi-fiber connection 17 includes a Physical Interface 19, which in this embodiment is an MPO cable with connectors and includes one or more Logical Bundles 20, with each Logical Bundle 20 including one or more PLPs 21. A Programmable Light Path (PLP) is a connection that is created by the Orchestration System from one point in the network to another for the use of packets to flow through the network. A PLP can also be a Packet Flow from one destination to another. The PLP, created by the Orchestration System traverses over one or more connectors and connections. A PLP may be the Physical path, such as a 10 Gbps connection from one point to another, passing through one or more EGS, PGS, connectors, and cable connections. A PLP may also be one of many Logical Paths 21 that are contained within a Physical Bundle 20. Within each Multi-fiber connection 17, there is a Logical Bundle 20, created by bundling fiber cable strands together to form a connection of certain type or speed, for example, 2 fiber strands can be bundled together and used to create a 10 Gbps connection or a 25 Gbps connection (a transmit fiber and a receive fiber), 8 fiber strands can be used to create a 40 Gbps (4 transmit fibers and 4 receive fibers using 10 Gbps each) or 100 Gbps connection (4 transmit fibers and 4 receive fibers using 25 Gbps each), 20 fiber strands can be used to create a 100 Gbps connection (10 transmit fibers and 10 receive fibers using 10 Gbps each), or 64 fibers are used to create a 800 Gbps connection (32 transmit fibers and 32 receive fibers using 25 Gbps each), or other such connections based on number of fiber strands. Within such a Multi-fiber connection 17, there can be one or more Logical Bundles 20. Each PLP 21 may be, for example, a fiber optic fiber or group of fibers within a multi-fiber connection. Multi-fiber connections 17 can have 12, 24, 48, 64, or 72 PLPs (e.g., fibers) within the same connection. A fiber can be configured to carry traffic at different rates such as 1 Gbps, 10 Gbps, 25 GBps, or other rates. Additionally, multiple fibers can be grouped as bundles to transmit at higher rates such as 40 Gbps, 100 Gbps, or other rates.

Figure 5B:
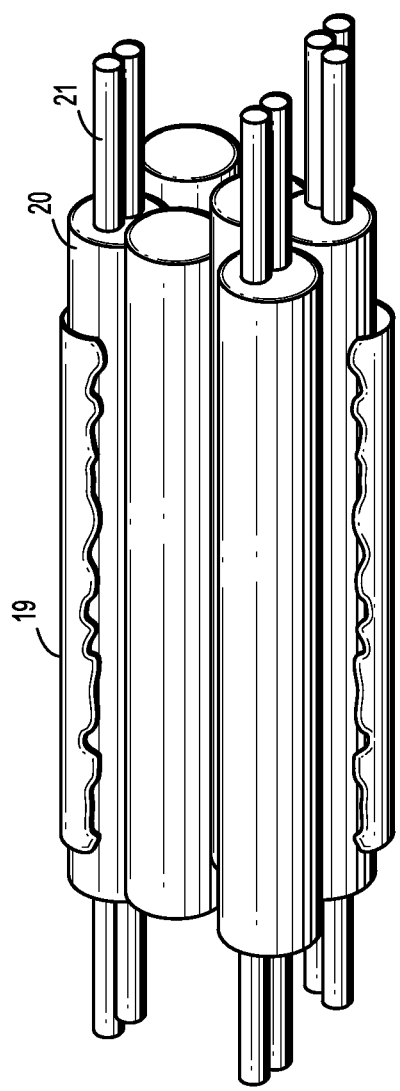

As shown in FIG. 5B, each Physical Interface 19 may include a plurality of Logical Bundles 20 each having a plurality of PLPs 21. A Logical Bundle 20 may include no PLPs 21 but may be defined for future use. Referring back to FIG. 4, it will be appreciated that EGS 16 thus actually has access to many PLPs and the Controller/Orchestration system 12 enables system administrators to assign the number of PLPs that are used for each destination. The EGS 16 is able to receive IP packets on one or more of its ports 11, and then process and groom the packets to be transmitted on the appropriate PLP 21. Controller/Orchestration system 12 is aware of the network architecture, and traffic can be groomed accordingly to reduce the number of hops.

As shown in the embodiments described above with respect to FIG. 4, the copper based or fiber optic ports 11, 14 of EGS 16 and PGS 18, respectively, may be implemented directly on the switches themselves. According to another embodiment as shown in FIG. 6, the copper based or fiber optic ports or other types of interfaces as described above may be mounted to separate packages (cassette or card) such as Patch Panel Modules 22 which can be inserted into EGS 16 and PGS 18. Patch Panel Modules 22 may themselves be configurable by the Controller/Orchestration system 12. This embodiment allows the network administrator to combine the functionality of the switching system with the functionality of a patching system. The network administrator or network designer has the choice of using the Patch Panel Module 22 or existing external patching systems. The patch panel connections can be uniquely identified, where the connector or adapter implemented on the switch or other device can be MPO, LC, SC, etc. each having a unique ID and the cable connecter that is inserted into the port can also have a unique ID associated with it. To be able to ascertain the unique identifiers, Patch Panel Modules 22 may be designed with ninth wire technologies interfaces, RFID tagging technology interfaces, connection point ID (CPID) technology interfaces, or other managed intelligence technologies or the Patch Panel Modules 22 may be designed with one or more of these different technology interfaces in order to provide the capabilities of supporting more than one particular managed intelligent technology. These unique IDs over the network wide interface allow physical connectivity information for the entire network to be readily obtained by Controller/Orchestration system 12.

Figure 3:
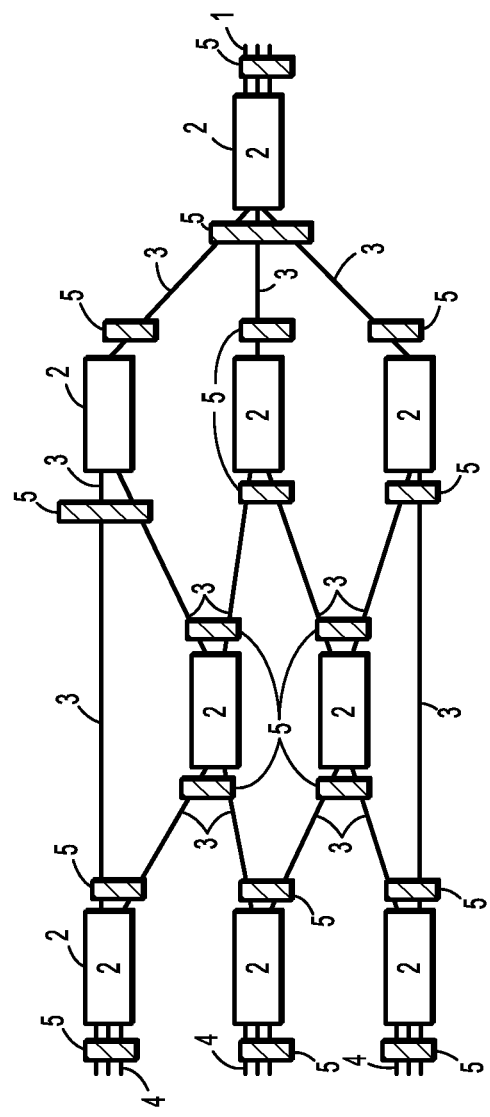
FIG. 3 depicts a more complicated network including patch panels according to the prior art.

FIG. 7 depicts how embodiments of the present disclosure can reduce the number of devices in the network, when compared to FIG. 3 (prior art) which contains a very large number of devices in the network. By managing traffic appropriately and taking advantage of the physical layer as part of the overall switching network, embodiments of the present disclosure can reduce the number of total devices in the network, provide a relatively simple configuration, and obtain a higher level of knowledge of how traffic flows through the network. For example, packets received at interfaces 11 of EGS 16A are groomed according to their destination and appropriate PLPs are set up between EGS 16A and PGS 18A, PGS 18B, and PGS 18C. Traffic received from interface 11 can be directly mapped to one or more PLPs in a single multi-fiber connection 17, or the traffic can undergo inspection and be routed to one or more PLPs in one or more of several multi-fiber connections 17A-17C.

Each MPO, MXC, or other multi-fiber connection 17 has a unique identifier; much like a MAC address and the Controller/Orchestration system 12 is able to read these unique cable identifiers from the MPO/MXC connections 17 using ninth wire technologies interfaces, RFID tagging technology interfaces, connection point ID (CPID) technology interfaces, or other managed intelligence technologies In addition, various other types of connections carrying one or more fiber pathways having unique identifiers may be utilized, where each pathway is also uniquely identified and reported throughout the system. For example, connections can be used on a switch or other device such as NIC card, or an optical cross connect, or other device using MPO, LC, SC or other types of fiber optic adapters and connectors.

The Controller/Orchestration system 12 enables system administrators to define pathways or PLPs and ensure that they have a system and network design that delivers desired results. Furthermore, if network administrators desire to reconfigure PLPs, they are able to do so using software rather than physically sending human beings to disconnect and reconnect network interfaces and connections, although there will still be some types of changes that can be performed by physical human intervention at the switch, router, EGS, EPS or other devices. Furthermore, the network managers are able to test the performance of a link using software and without human intervention on the line, which is a capability that was not possible before.

The above-described embodiments thus simplify the network by grooming traffic at fewer points than in a traditional network that has traditional switches and routers. The simplification comes as a result of having fewer switches and the ability of EGS and PGS devices to replace several "hops" of the traditional switch and router network.

Although described herein utilizing MPO connections, other types of connections may be used including, for example, MTP connections. The above-described embodiments can use the MTP, MPO, or MXC connections at the switch (EGS, PGS) to transport one or more connections of 1 GB, 10 GB, 25 GB, 40 GB, 100 GB through the same connection. This reduces the number of physical ports required on the switch. An MTP, MPO, or MXC connection located directly on a switch and carrying multiple 1 GB, 10 GB, 25 GB, 40 GB, 100 GB, or other speed connections has not heretofore been available.

As described above, embodiments of the present disclosure may use unique port and connection identifiers to document each connection point in the system. Any of several identification technologies can be used to accomplish the identification process, including but not limited to Connection Point ID (CPID) technology. While CPID technology is known in the art, it has not heretofore been used on a switch or NIC card previously. Furthermore, CPID technology has not heretofore been implemented in a system carrying multiple streams of 10, 25, 40, 100, 400 GB simultaneously.

The use of traffic grooming as described herein may involve the process of grouping many small communications flows into larger units, which can be processed as single entities. In this way, multiple flows of traffic destined for a common node can be placed on the same PLP. Traffic grooming may also involve re-amplification, reshaping and/or retiming of signals within the network.

It will be understood that various modifications can be made to the embodiments of the present disclosure without departing from the spirit and scope thereof. Therefore, the above description should not be construed as limiting the disclosure, but merely as embodiments thereof. Those skilled in the art will envision other modifications within the scope and spirit of the invention as defined by the claims appended hereto. For example, the network interfaces contemplated by the present disclosure can utilize various communication protocols for network communications. Further, the network interfaces may use various embodiments of transceivers and connectors for communication paths. As another example, the data center network architectures contemplated by the present disclosure can include single layer and multi-layer switching layers.

What is claimed is:

1. A system for communicating traffic within a network comprising:

a fiber optic pathway bundle providing one or more fiber optic pathways, wherein each of the one or more fiber optic pathways includes a physical layer identifier uniquely identifying the fiber optic pathway;

at least one edge grooming switch having one or more ports, each of the one or more edge grooming switch ports includes a physical layer identifier uniquely identifying each edge grooming switch port, the at least one edge grooming switch being operatively connected to the fiber optic pathway bundle, the at least one edge grooming switch being capable of receiving traffic on the one or more edge grooming switch ports and redirecting the traffic onto the one or more fiber optic pathways of the fiber optic pathway bundle;

at least one path grooming switch connected to the fiber optic pathway bundle and capable of receiving the traffic from the one or more fiber optic pathways and redirecting the traffic to one or more path grooming switch ports, wherein each path grooming switch port includes a physical layer identifier uniquely identifying each path grooming switch port; and a controller for controlling the at least one edge grooming switch, the at least one path grooming switch and the fiber optic pathway bundle for optimizing the one or more fiber optic pathways for the traffic to flow, wherein the controller configures the one or more fiber optic pathways into logical bundles that form a connection of a certain speed based on a destination of the traffic received by the at least one edge grooming switch, and wherein the controller during the configuring of the one or more fiber optic pathways identifies each path grooming switch port utilizing the path grooming port physical layer identifier, each edge grooming switch port utilizing the edge grooming port physical layer identifier and each fiber optic pathway utilizing the pathway physical layer identifier.

2. The system as recited in claim 1, wherein the one or more ports of the edge grooming switch are capable of receiving the traffic from copper or fiber optic cables, and wherein the one or more ports on the at least one path grooming switch are capable of transferring the traffic to copper or fiber optic cables.

3. The system as recited in claim 1, wherein the traffic comprises packets of data.

4. The system as recited in claim 1, wherein the fiber optic pathways comprise at least one fiber optic cable.

5. The system as recited in claim 1, wherein the fiber optic pathway bundle comprises at least one multifiber cable.

6. The system as recited in claim 1, wherein the fiber optic pathways are connected to the at least one edge grooming switch using high density fiber connections.

7. The system as recited in claim 6, wherein the high density fiber connections comprise one of MPO, MTP and MXC connections.

8. The system as recited in claim 1, wherein the fiber optic pathways are connected to the at least one path grooming switch using high density fiber connections.

9. The system as recited in claim 8, wherein the high density fiber connections comprise one of MPO, MTP and MXC connections.

10. The system as recited in claim 1, wherein the at least one edge grooming switch receives traffic on the one or more edge grooming switch ports from copper connections.

11. The system as recited in claim 1, wherein the at least one edge grooming switch receives traffic on the one or more edge grooming switch ports from fiber optic connections.

* * * * *